May 24, 1960
J. CSMEREKA
2,937,835
UNIVERSAL CABLE CLAMP
Filed May 2, 1957
2 Sheets-Sheet 1
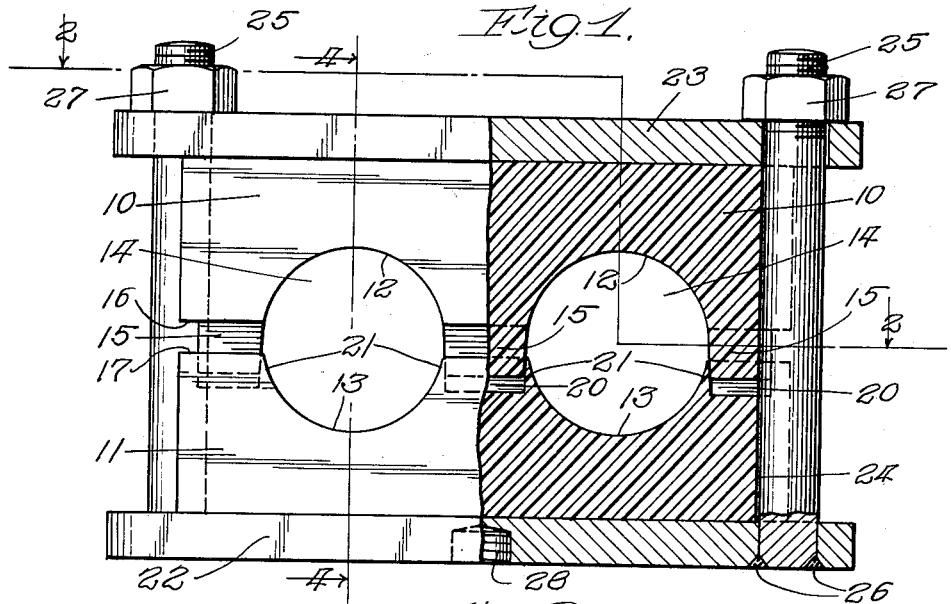
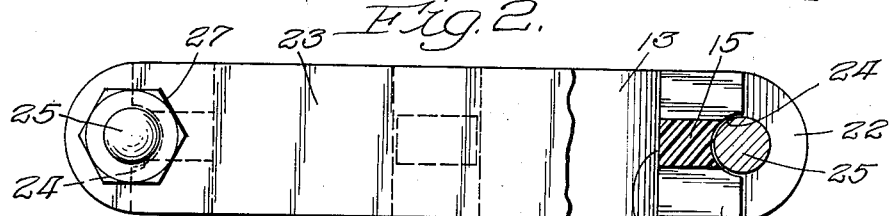
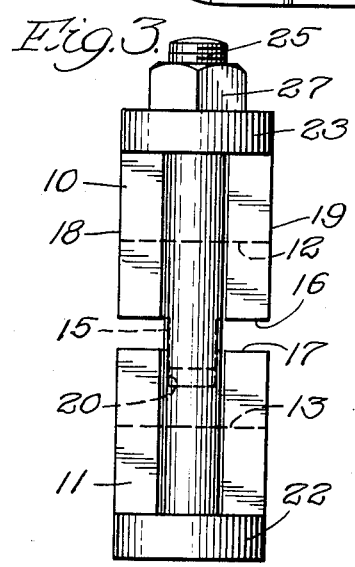 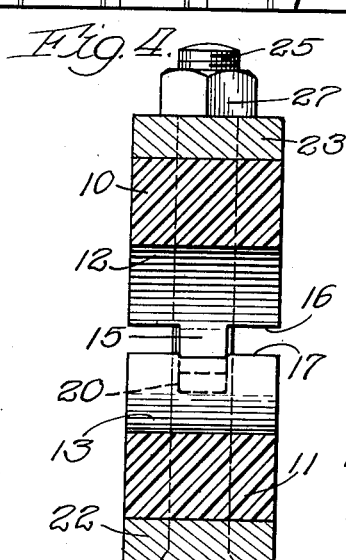 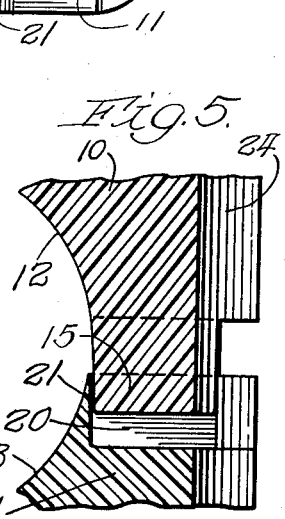
Inventor:
John Csmereka,
By Merriam & Lorch,
Attys.

May 24, 1960  J. CSMEREKA  2,937,835
UNIVERSAL CABLE CLAMP
Filed May 2, 1957  2 Sheets-Sheet 2
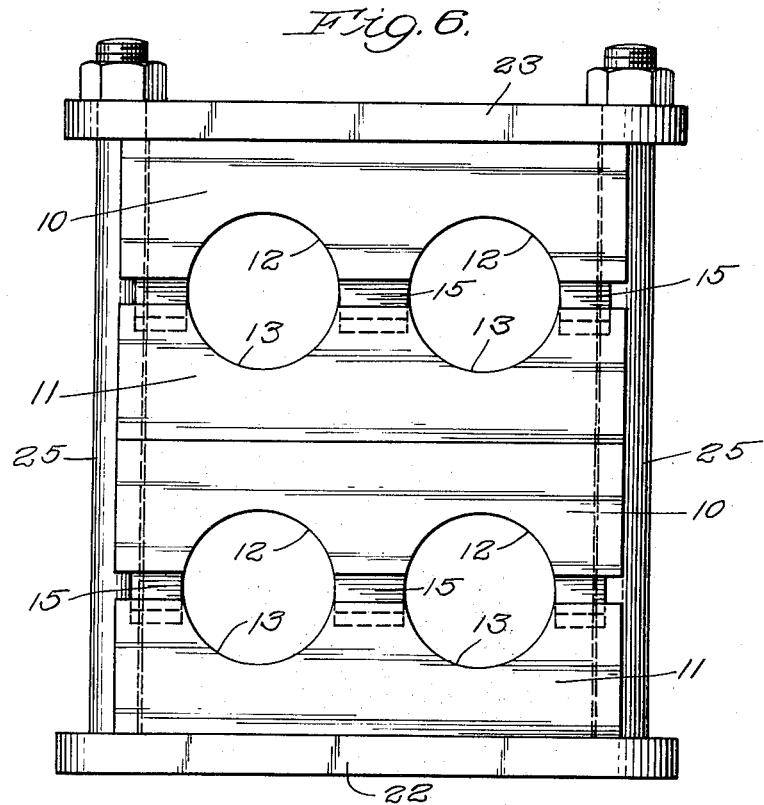
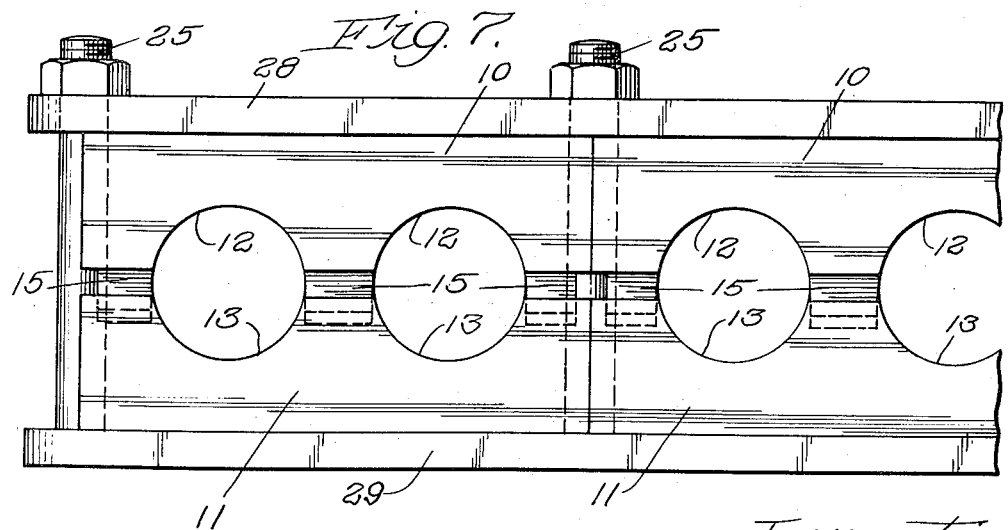
Inventor:
John Csmereka,
By Merriam & Lorch,
Attys.

2,937,835
UNIVERSAL CABLE CLAMP

John Csmereka, 4006 Deodar St., East Chicago, Ind.

Filed May 2, 1957, Ser. No. 656,641

5 Claims. (Cl. 248—74)

This invention relates to clamping devices for cables, wire, pipe, and the like. More particularly, this invention is concerned with a novel clamp which will securely hold cables of various sizes without modifying the clamp structure.

Clamps which are capable of holding only one size of cable or wire and the like are widely used. One of the drawbacks connected with their use, however, is that a specific size clamp must be stocked for each cable size. In addition, it often happens that a technician installing or repairing power lines goes to a remote location only to find that he has not brought the right size clamp. He may then squeeze the cable into an undersized clamp or use packing of any kind around a small cable to adapt it to a large size clamp rather than lose time obtaining the right size clamp. The resulting workmanship is, of course, substandard and likely to lead to cable slippage, sagging, and short circuits.

According to the present invention there is provided a novel universal cable clamp which will firmly hold, at any one time, one of a plurality of different size cables between cooperating movable gripping jaws.

The invention will now be described in conjunction with the attached drawings in which:

Fig. 1 is an elevation partially in section of one version of the cable clamp;

Fig. 2 is a plan view of the clamp of Fig. 1 taken partially in section along the line 2—2 of Fig. 1;

Fig. 3 is an end elevation of the clamp of Fig. 1;

Fig. 4 is a sectional view taken at the line 4—4 of Fig. 1;

Fig. 5 is an enlarged view of part of the section shown in Fig. 1;

Fig. 6 is a multiple clamp having the jaws arranged in tiers; and

Fig. 7 is a multiple clamp having the jaws arranged in side-by-side relationship.

The same number shall be used herein to identify the same element or part of the clamp in each of the views.

The cable clamp seen in Figs. 1–5 comprises a gripping element made of a set of jaw blocks 10 and 11 which are substantially rectangular like pieces having opposing jaw faces 16 and 17 provided with cable gripping seats 12 and 13. The cable gripping seats are depressions in the jaw faces of the blocks and are arranged so that by bringing the jaws together the seats cooperate to form an aperture 14 into which a cable or other member may be placed and secured by the jaw blocks.

Jaw face 16 is provided with tongue portions 15 on each side of the cable seat depressions 12. The tongue portions 15 are advisably longitudinally aligned with each other and centrally located in jaw face 16 between the front side 18 and rear side 19 of the clamp. Generally, the sides of the tongues 15 adjacent the cable seats are arranged to communicate smoothly therewith.

Block 11 has groove portions 20 in jaw face 17. The groove portions 20 are cooperatively positioned to receive tongue portions 15 therein. A rabbet joint is thereby formed. While the groove portions 20 may be open ended, a superior clamping area is produced by providing lips 21 at the ends of the grooves adjacent cable seat depressions 13. The lips are generally formed with surfaces smoothly communicating with the cable seat depressions 13 to avoid pinching the cable winding. Providing the lip eliminates a cavity which otherwise will be present in the cable seat depression because of the groove. The lip is the full width of the groove and usually has a vertical wall on the groove side. The lip is made of any convenient height commensurate with movement of the jaw blocks to the extent desired.

Plates 22 and 23 are placed at the top and bottom of the gripping element made of blocks 10 and 11 as reinforcement although it should be understood that such plates are not essential with blocks of adequate inherent strength. However, jaw blocks of insulating material such as Bakelite are preferably reinforced with such back-up plates. Grooves 24 are preferably provided in the ends of the blocks to partially engage bolts 25 and thereby hold the blocks and plates in a cooperating unitary assembly capable primarily only of vertical expansion or contraction for gripping or releasing a cable. The bolts 25 are welded at 26 to one of the plates 22 and by nuts 27 pressure is applied to tighten the clamp. Hole 28 is tapped to receive a bolt to hold the clamp on a suitable framework.

Although the aperture 14 may be any desired shape, an annular hole is generally satisfactory for most clamping purposes. With a circular hole, however, it is most advantageous to have the tongues 15 partially in the grooves 20 when the hole is in the maximum expanded position it can assume and still hold a cable not greater than the width of the cable seat. When the tongues are so positioned in the grooves a smooth walled hole is formed which prevents the cable from being pinched between the tongue and grooves.

With an annular hole, such as a circle, it is generally advantageous to have the maximum vertical dimension of the hole essentially no larger than the width of the hole. In other words, the hole should be a perfect circle when in the most open position rather than when in a half closed, or closed position because it would ordinarily serve no useful purpose to have a vertical dimension greater than the width because the hole could not accommodate a round cable of a diameter greater than the width without inducing an initial deformation of the cable. However, by having the hole a circle when the clamp is half-closed, the differential between the width on one hand and either the maximum or minimum vertical dimension on the other hand will be the smallest. It should be understood, however, that any desired shaped cable seats may be used as dictated by a need.

There is shown in Fig. 6, a tiered cable clamp having jaw blocks like those illustrated and described in Figs. 1–5. Such a tiered clamp is readily formed by using two sets of cooperating jaw blocks with one set on top of the other set. Only one set of bolts and one set of plates are needed to secure the jaw blocks into a multiple cable clamp.

Instead of forming a multiple clamp of tiered sets of cooperating jaw blocks, the jaw block sets may be arranged longitudinally end-to-end and continuous, one piece plates 28 and 29 used on the top and bottom of the so aligned jaw block sets to complete the clamp as shown in Fig. 7. Obviously, while this drawing shows the clamp made of a plurality of upper and lower jaw blocks, each may be made of one piece if desired. However, by using a standard set of jaw blocks such as shown in the drawings, great flexibility is achieved without the need for making special size jaw blocks.

It should be understood that the disclosed structure is suitable for use with a jaw block set having either one or more cable apertures and is not restricted to those having only two holes as shown in Figs. 1–5.

Various changes and modifications of the invention can be made and, to the extent that such variations incorporate the spirit of this invention, they are intended to be included within the scope of the appended claims.

What is claimed is:

1. A clamp comprising a pair of cooperating jaw blocks with opposing parallel sides, arranged face-to-face to each other, each opposing side of the jaw blocks having a depression which extends laterally through the entire thickness of the block, the depressions in the opposing faces cooperating with each other to form an aperture with the surfaces of the opposing depressions forming gripping jaw faces, the opposing sides of the jaw blocks having cooperating rabbets beginning at, and on each side of, the opposing depressions, said rabbets running longitudinal to the opposing sides, and means to secure the jaw blocks together to hold a cable or the like in the aperture.

2. A clamp comprising a pair of cooperating jaw blocks arranged with opposing parallel sides face-to-face to each other, each opposing side of the jaw blocks having a depression which extends laterally through the entire thickness of the block, the depressions in the opposing faces cooperating with each other to form an aperture with the surfaces of the opposing depressions forming gripping jaw faces, the opposing parallel sides of the jaw blocks having cooperating tongue-and-groove rabbets beginning at, and on each side of, the opposing depressions, said rabbets running longitudinal to the opposing sides, and means to secure the jaw blocks together to hold a cable or the like in the aperture.

3. The clamp of claim 2 in which the pair of jaw blocks form a substantially rectangular solid, the depressions are substantially semi-circular, and the aperture is substantially circular.

4. A clamp comprising a pair of cooperating jaw blocks arranged with opposing parallel sides face-to-face to each other, each opposing side of the jaw blocks having a depression which extends laterally through the entire thickness of the block, the depressions in the opposing faces cooperating with each other to form an aperture with the surfaces of the opposing depressions forming gripping jaw faces, the opposing parallel sides of the jaw blocks having cooperating tongue-and-groove rabbets on each side of the opposing depressions communicating with the depressions except for a lip across the end of each groove terminating at the depression, said rabbets running longitudinal to the opposing sides, and means to secure the jaw blocks together to hold a cable or the like in the aperture.

5. The clamp of claim 4 in which the pair of jaw blocks form a substantially rectangular solid, the depressions are substantially semi-circular, and the aperture is substantially circular.

References Cited in the file of this patent

UNITED STATES PATENTS

| | | |
|---|---|---|
| 428,660 | Yerdon | May 27, 1890 |
| 544,501 | Buffinton | Aug. 13, 1895 |
| 631,234 | Stevens | Aug. 15, 1899 |
| 910,975 | Vickers | Jan. 26, 1909 |
| 911,864 | Ball | Feb. 9, 1909 |
| 2,417,260 | Morehouse | Mar. 11, 1947 |